US008666176B2

(12) United States Patent
Oshima

(10) Patent No.: US 8,666,176 B2
(45) Date of Patent: Mar. 4, 2014

(54) OBJECT RECOGNITION APPARATUS AND OBJECT RECOGNITION METHOD

(75) Inventor: Yuta Oshima, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 685 days.

(21) Appl. No.: 12/903,041

(22) Filed: Oct. 12, 2010

(65) Prior Publication Data

US 2011/0091108 A1     Apr. 21, 2011

(30) Foreign Application Priority Data

Oct. 19, 2009   (JP) ................................. 2009-240810

(51) Int. Cl.
*G06K 9/68*       (2006.01)
*G06K 9/70*       (2006.01)

(52) U.S. Cl.
USPC ......................................................... 382/227

(58) Field of Classification Search
USPC .................. 382/155–161, 226–228
See application file for complete search history.

(56) References Cited

U.S. PATENT DOCUMENTS

| 7,508,961 | B2* | 3/2009 | Chen et al. | 382/118 |
|---|---|---|---|---|
| 7,889,892 | B2 | 2/2011 | Terakawa | |
| 7,983,480 | B2* | 7/2011 | Lu et al. | 382/166 |
| 8,155,396 | B2 | 4/2012 | Ito | |
| 8,189,900 | B2* | 5/2012 | Sammak et al. | 382/133 |
| 8,331,631 | B2 | 12/2012 | Yamaguchi | |
| 8,538,081 | B2* | 9/2013 | Ding et al. | 382/103 |
| 2005/0213810 | A1* | 9/2005 | Sabe et al. | 382/159 |
| 2005/0220336 | A1* | 10/2005 | Sabe et al. | 382/159 |
| 2005/0280809 | A1* | 12/2005 | Hidai et al. | 356/237.3 |
| 2007/0201857 | A1* | 8/2007 | Kitamura | 396/222 |
| 2008/0219558 | A1* | 9/2008 | Lu et al. | 382/190 |
| 2008/0285849 | A1* | 11/2008 | Lu et al. | 382/166 |
| 2009/0116693 | A1* | 5/2009 | Yamamoto et al. | 382/103 |
| 2009/0175533 | A1* | 7/2009 | Sabe et al. | 382/159 |
| 2012/0207358 | A1* | 8/2012 | Blonk et al. | 382/118 |
| 2013/0156303 | A1* | 6/2013 | Yamamoto et al. | 382/159 |

FOREIGN PATENT DOCUMENTS

| JP | 2007-065844 A | 3/2007 |
|---|---|---|
| JP | 2007-193404 A | 8/2007 |
| JP | 2007-213182 A | 8/2007 |

OTHER PUBLICATIONS

Informational Processing Journal, vol. 5, No. 4, pp. 319-326 (Apr. 15, 2009).
Ming-Hsuan Yang, et al., "Detecting Faces in Images: A Survey", IEEE Transactions on Pattern Analysis and Machine Intelligence, vol. 24, No. 1, Jan. 2002.
Henry A. Rowley, et al., "Neural Network-Based Face Detection", IEEE Transactions on Pattern Analysis and Machine Intelligence, vol. 20, No. 1, Jan. 1998.
Paul Viola, et al., "Rapid Object Detection using a Boosted Cascade of Simple Features", Proceedings of the IEEE Conference on Computer Vision and Pattern Recognition, 2001.

* cited by examiner

*Primary Examiner* — Aaron W Carter
(74) *Attorney, Agent, or Firm* — Fitzpatrick, Cella, Harper & Scinto

(57) ABSTRACT

Recognition target area images are sequentially clipped out from an input image. Each of the clipped-out recognition target area images is recognized as or not as an image related to an object by referring to each of a plurality of dictionary data items stored in advance for recognizing the object. Based on the recognition result for a recognition target area image, the order in which each of the plurality of dictionary data items is referred to for a partial image in the neighborhood of the recognition target area image is determined. Thus, the time required for recognizing the object is reduced.

10 Claims, 11 Drawing Sheets

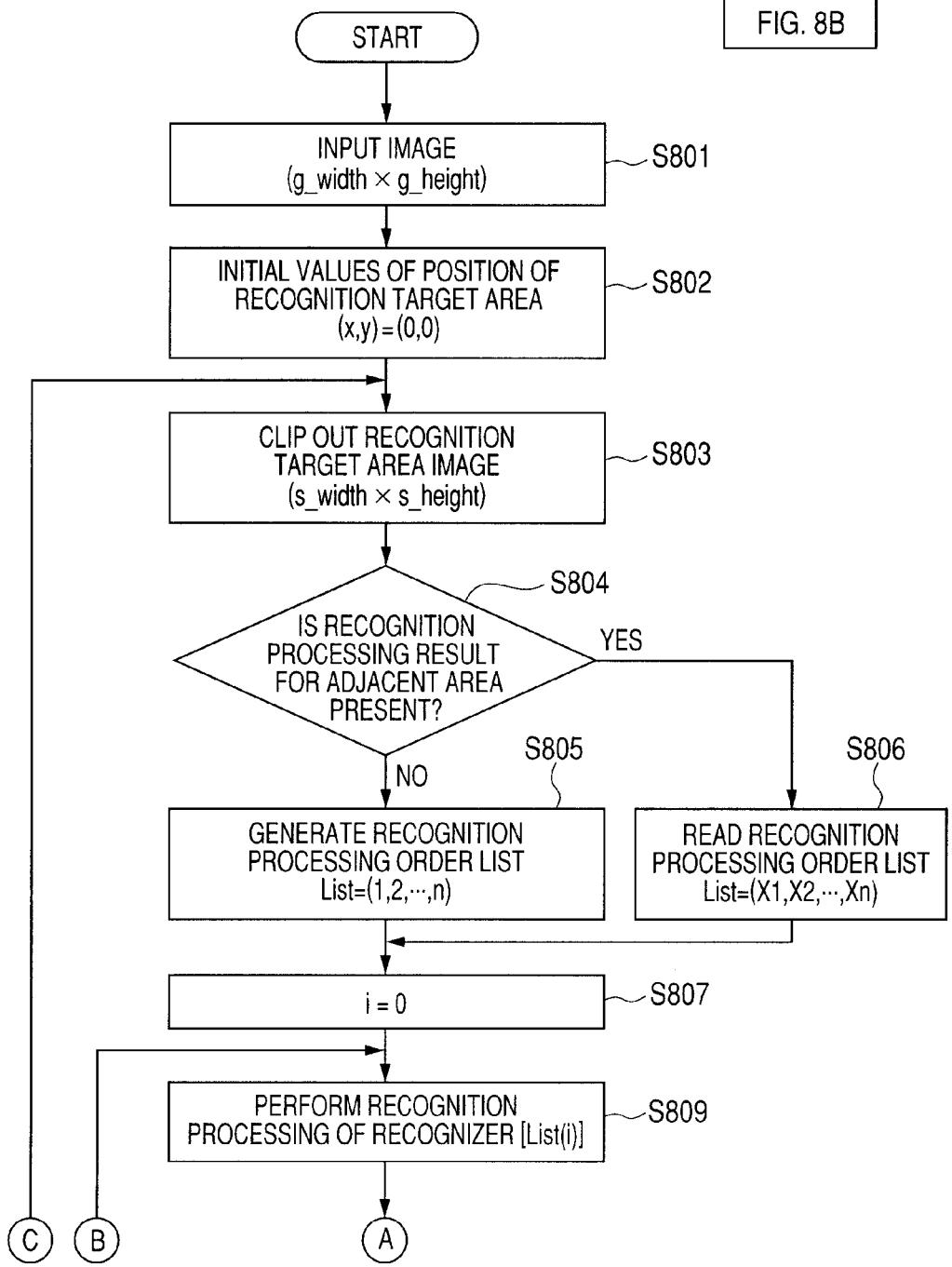

FIG. 10

| | 1 | 2 | 3 | 4 | 5 | 6 | 7 | 8 | 9 | 10 | Pass |
|---|---|---|---|---|---|---|---|---|---|---|---|
| 1 | 28374 | 4230 | 1328 | 420 | 764 | 329 | 283 | 121 | 53 | 14 | 2 |
| 2 | 5783 | 24312 | 4832 | 1739 | 2439 | 1329 | 420 | 125 | 243 | 32 | 11 |
| 3 | 932 | 4623 | 13247 | 2392 | 3549 | 1743 | 348 | 143 | 328 | 63 | 17 |
| 4 | 532 | 1649 | 1254 | 8374 | 857 | 432 | 383 | 23 | 243 | 71 | 26 |
| 5 | 634 | 1520 | 1320 | 1045 | 5320 | 2043 | 752 | 480 | 843 | 132 | 42 |
| 6 | 320 | 1086 | 845 | 732 | 2481 | 2341 | 439 | 231 | 780 | 97 | 39 |
| 7 | 231 | 463 | 351 | 749 | 1329 | 1532 | 943 | 183 | 329 | 193 | 47 |
| 8 | 32 | 138 | 85 | 93 | 343 | 241 | 643 | 430 | 210 | 143 | 42 |
| 9 | 14 | 42 | 130 | 329 | 540 | 429 | 743 | 485 | 574 | 394 | 74 |
| 10 | 9 | 12 | 34 | 47 | 193 | 134 | 246 | 84 | 283 | 342 | 114 |
| Pass | 3 | 6 | 14 | 23 | 45 | 19 | 46 | 132 | 93 | 120 | 164 |

Rows: ABORTED RECOGNIZER NUMBER FOR PROCESSING OF ADJACENT AREA IMAGE
Columns: ABORTED RECOGNIZER NUMBER FOR PROCESSING OF RECOGNITION TARGET AREA IMAGE

OBJECT RECOGNITION APPARATUS AND OBJECT RECOGNITION METHOD

BACKGROUND OF THE INVENTION

1. Field of the Invention

The present invention relates to an object recognition apparatus and an object recognition method.

2. Description of the Related Art

Image processing methods for automatically detecting a particular object pattern from an image have been known. Such image processing methods are very useful and can be utilized for determination of human faces, for example. The methods can be used in many fields, such as teleconferencing, man-machine interfaces, security, monitor systems for tracking human faces, and image compression.

A recently disclosed technique for detecting faces from an image utilizes several noticeable features (such as two eyes, a mouth and a nose), unique geometric position relationships among these features, symmetrical features of human faces, and complexional features of human faces. For example, see Yang et al, "Detecting Faces in Images: A Survey", IEEE TRANSACTIONS ON PATTERN ANALYSIS AND MACHINE INTELLIGENCE, VOL. 24, NO. 1, JANUARY 2002.

However, with the technique described in the above document, recognizing faces in an image involves computation processing uniformly for the above features. Therefore, it may take long to recognize faces.

SUMMARY OF THE INVENTION

An object of the present invention is to reduce the time required for recognizing an object.

To solve the above problem, the present invention provides an object recognition apparatus comprising: a clipping-out unit configured to sequentially clip out partial images from an input image; a recognizing unit configured to recognize that each of the partial images clipped out by the clipping-out unit is or is not an image related to an object by referring to each of a plurality of recognition information items stored in advance in a storage unit for recognizing the object; and a determining unit configured to determine, based on a recognition result of the recognizing unit for a certain partial image, an order in which the recognizing unit refers to each of the plurality of recognition information items for a partial image in the neighborhood of the certain partial image.

Further features and aspects of the present invention will become apparent from the following detailed description of exemplary embodiments with reference to the attached drawings.

Further features of the present invention will become apparent from the following description of exemplary embodiments with reference to the attached drawings.

BRIEF DESCRIPTION OF THE DRAWINGS

FIG. 10 is a diagram illustrating correlations between recognition processing results.

DESCRIPTION OF THE EMBODIMENTS

Preferred embodiments of the present invention will now be described in detail in accordance with the accompanying drawings.

Embodiments of the present invention will be described below with reference to the drawings.

In a first embodiment, an object recognition apparatus that uses recognizers to detect faces from an image (face detection) will be described.

Figure 1A:
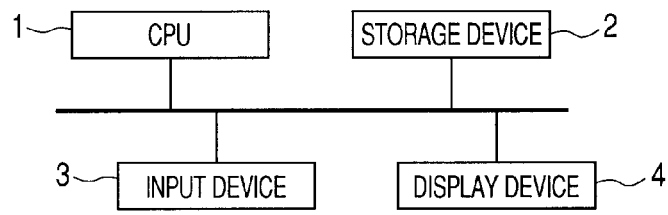
FIGS. 1A and 1B are diagrams illustrating configurations of an object recognition apparatus.

FIG. 1A is a diagram illustrating a hardware configuration of the object recognition apparatus. The object recognition apparatus includes a CPU (Central Processing Unit) 1, a storage device 2, an input device 3, and a display device 4. These devices are configured to be able to communicate with each other and are interconnected with a bus.

The CPU 1 controls the operation of the object recognition apparatus and executes programs stored in the storage device 2.

The storage device 2 may be a magnetic storage device or semiconductor memory, and stores programs read according to the operation of the CPU 1 and data that needs to be stored for a long time.

In the embodiment, functions in the object recognition apparatus and processing related to a flowchart to be described later are implemented by the CPU 1 performing processing according to a procedure of a program stored in the storage device 2.

The input device 3 may be a mouse, a keyboard, a touch panel device or buttons, and inputs various instructions.

The display device 4 may be a liquid crystal panel or an external monitor, and displays various sorts of information.

The hardware configuration of the object recognition apparatus is not limited to the above-described configuration. For example, the object recognition apparatus may include an I/O device for communication with various devices. Exemplary I/O devices are an I/O unit for a memory card or for a USB cable, and a wired or wireless transmission/reception unit. The object recognition apparatus may also include an imaging device, for example. The imaging device may be a camcorder or the like, which includes an image pickup device such as a CCD (Charge Coupled Device) or a CMOS (Complementary Metal Oxide Semiconductor). Image data taken with the imaging device may be stored in the storage device 2.

Now, taking examples of various face detection apparatuses for detecting faces, underlying techniques for face detection with the object recognition apparatus will be described.

Figure 2:
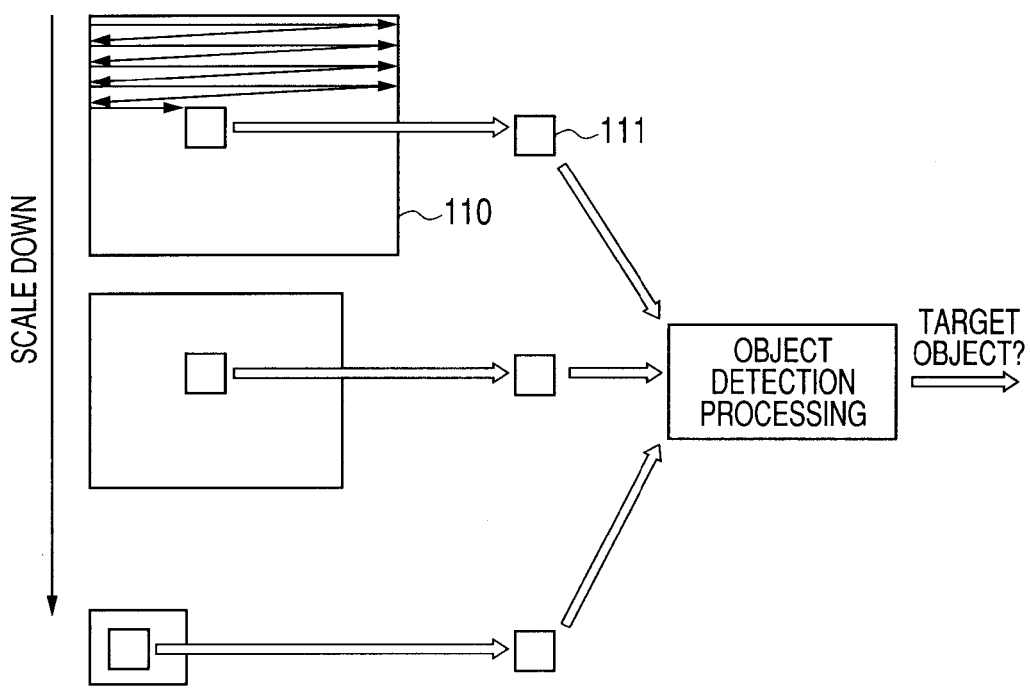
FIG. 2 is a diagram illustrating exemplary scan in face detection.

First, a face detection apparatus reads image data to be subjected to face detection into memory and, from the read image, clips out a predetermined rectangular area that is a partial area to be matched with faces. The face detection apparatus takes a pixel value distribution in the clipped-out rectangular area as an input and obtains one output with neural network-based operations. Here, weights and thresholds for the neural network are learned in advance with a vast number of facial image patterns and non-facial image patterns. For example, the face detection apparatus identifies a face if the output of the neural network is not smaller than 0: otherwise, a non-face is identified. As illustrated in FIG. 2, for example, the face detection apparatus detects faces from the image by horizontally and vertically scanning positions for clipping out the rectangular area (e.g., a recognition target area image 111 to be described later) as inputs to the neural network one after another across the entire area of an input image 110. In order to address detection of various sizes of faces, the face detection apparatus successively scales down the read image by predetermined factors as illustrated in FIG. 2 to perform the above face detection scan for the scaled-down images. For details of the neural network-based method of detecting facial patterns in an image, see Rowley et al, "Neural network-based face detection", IEEE TRANSACTIONS ON PATTERN ANALYSIS AND MACHINE INTELLIGENCE, VOL. 20, NO. 1, JANUARY 1998, for example.

In another face detection apparatus that focuses the attention on speedup of processing, AdaBoost is used to increase the face identification accuracy with an effective combination of many weak discriminators. For example, see Viola and Jones, "Rapid Object Detection using Boosted Cascade of Simple Features", Proceedings of the IEEE Conference on Computer Vision and Pattern Recognition (CVPR '01).

Figure 3:
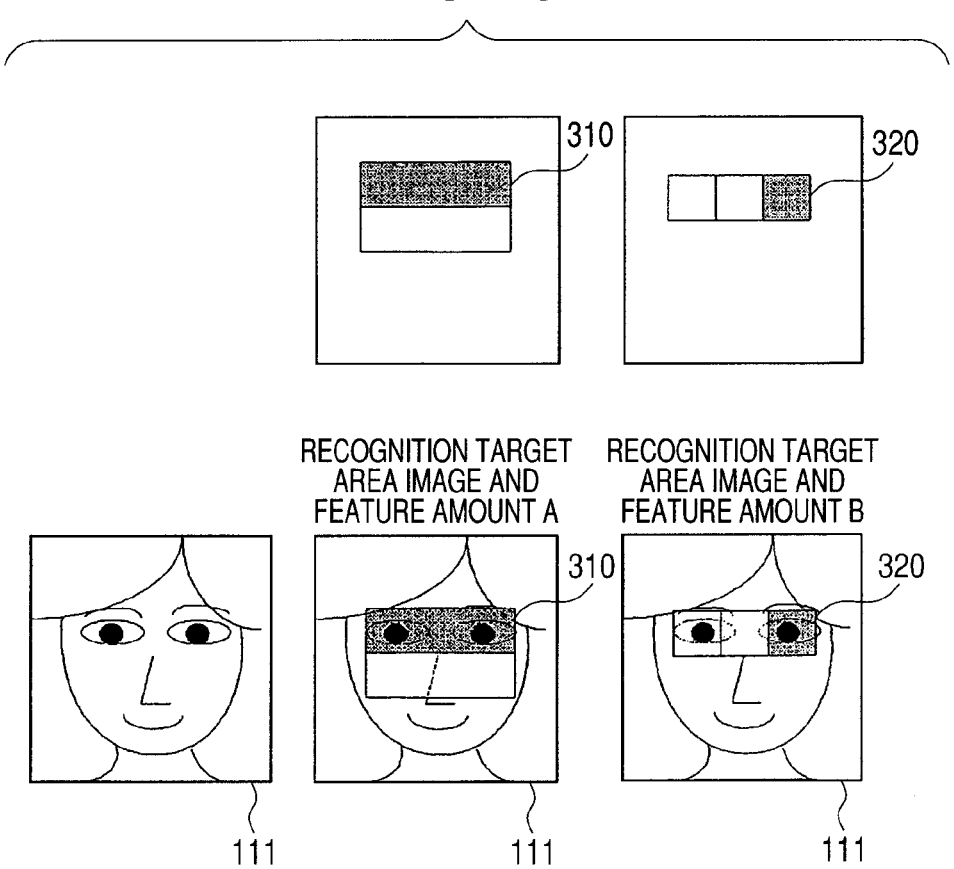
FIG. 3 is a diagram illustrating an overview of feature amounts.

A further face detection apparatus employs a configuration in which each weak discriminator is configured with a Haar-type rectangle feature amount, and an integral image is used to calculate the rectangle feature amount at a high speed. This Haar-type rectangle feature amount will be described with reference to FIG. 3. A feature amount A (310) includes a portion of both eyes and a portion below both eyes (a cheek portion), and this is a feature amount indicating a feature that the portion of both eyes is darker than the portion below both eyes. A feature amount B (320) includes portions of both eyes and a glabella portion, and this is a feature amount indicating that eye portions in the portions of both eyes are darker and the glabella portion between the eyes is lighter than the portions of both eyes. In the face detection apparatus that uses the Haar-type rectangular feature amounts, such learning results (learned feature amounts) are matched with the recognition target area image 111 (feature amounts of a partial image) to output recognition results as TRUE/FALSE.

Figure 4:
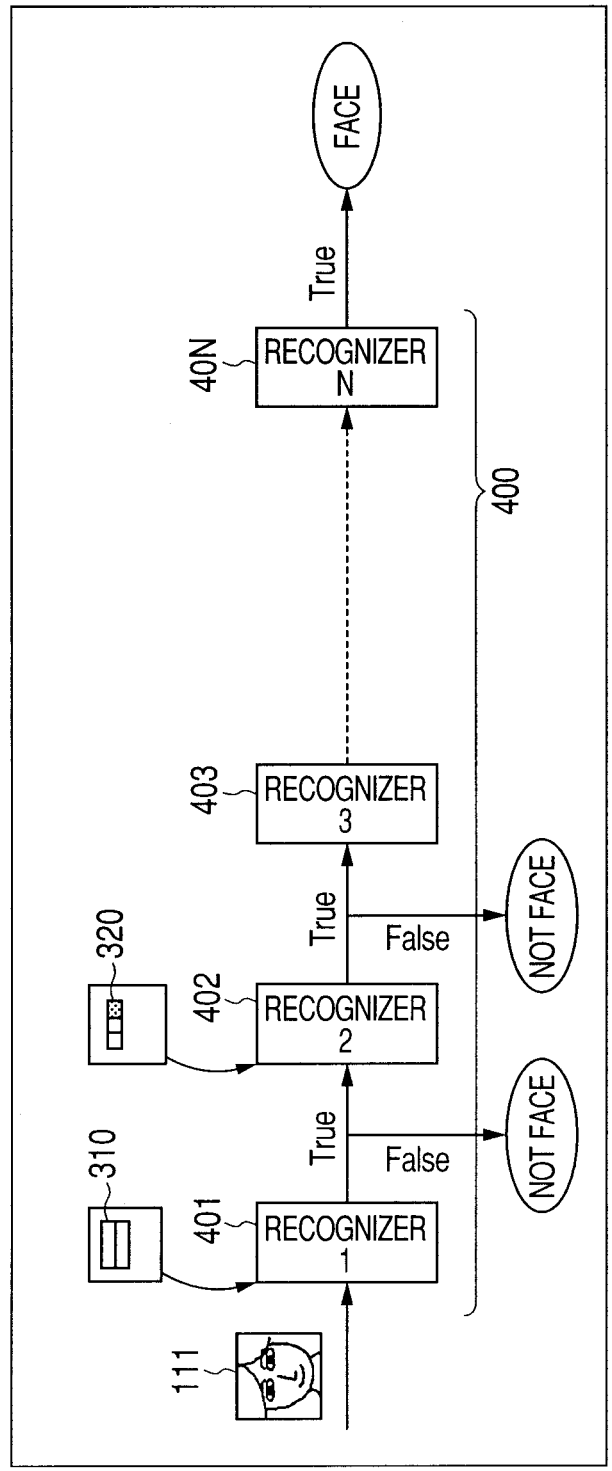
FIG. 4 is a diagram illustrating exemplary cascade connection.

In a still further face detection apparatus, recognizers obtained with AdaBoost learning are serially connected to configure a cascade face detector (see the above Viola document). FIG. 4 illustrates a configuration of the cascade face detection apparatus. This cascade face detection apparatus first uses a simpler (i.e., with a smaller amount of computation) recognizer at a preceding stage to remove candidates of patterns that are obviously not a face on the spot. Then, for only the remaining candidates, a more complex (i.e., with a larger amount of computation) recognizer with higher recognition performance at a following stage is used to determine whether or not each candidate is a face. That is, with this configuration, the processing is fast because there is no need to perform complex determination for all the candidates. Thus, to detect facial patterns from an image in the cascade face detection apparatus, the recognition target area images 111 are sequentially clipped out from the image and are input as illustrated in FIG. 2.

However, in the above-described face detection apparatus, the processing order of the recognizers 1 (401), 2 (402), . . . , and N (40N) is arranged in a descending order of recognition effect for the vast number of facial patterns and non-facial patterns used in the AdaBoost learning. Such a processing order is optimal if the recognition target area images 111 are randomly input to the face detector. However, such a processing order may not be necessarily optimal if the recognition target area images 111 are clipped out from one image by horizontally and vertically scanning them one after another.

The reason for this will be described below.

Figure 5:
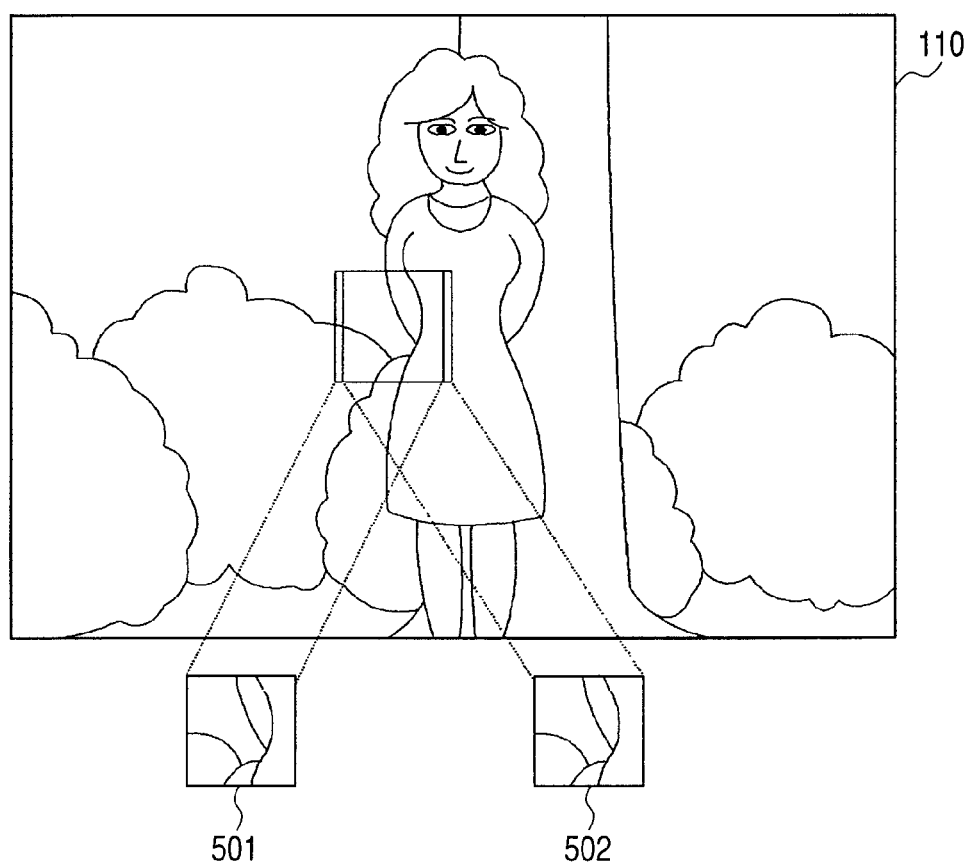
FIG. 5 is a diagram illustrating an exemplary adjacent area image.

For example, an image pattern P1 (501) illustrated in FIG. 5 is input to the cascade face detection apparatus. As recognition results, the image pattern P1 (501) passes through the recognizer 1 (401) and the recognizer 2 (402) illustrated in FIG. 4 (i.e., is determined as a face candidate) and is determined as not a face in the recognizer K (40K). Then, if an image pattern P2 (502) adjacent to the image pattern P1 (501) illustrated in FIG. 5 is input to the cascade face detection apparatus, the image pattern P2 (502) is also likely to pass through the recognizer 1 (401) and the recognizer 2 (402) and be determined as not a face in the recognizer K (40K). This is because the image pattern P1 (501) and the image pattern P2 (502) have many image portions in common and therefore have high correlations between Haar-type rectangular feature amounts.

Figure 6:
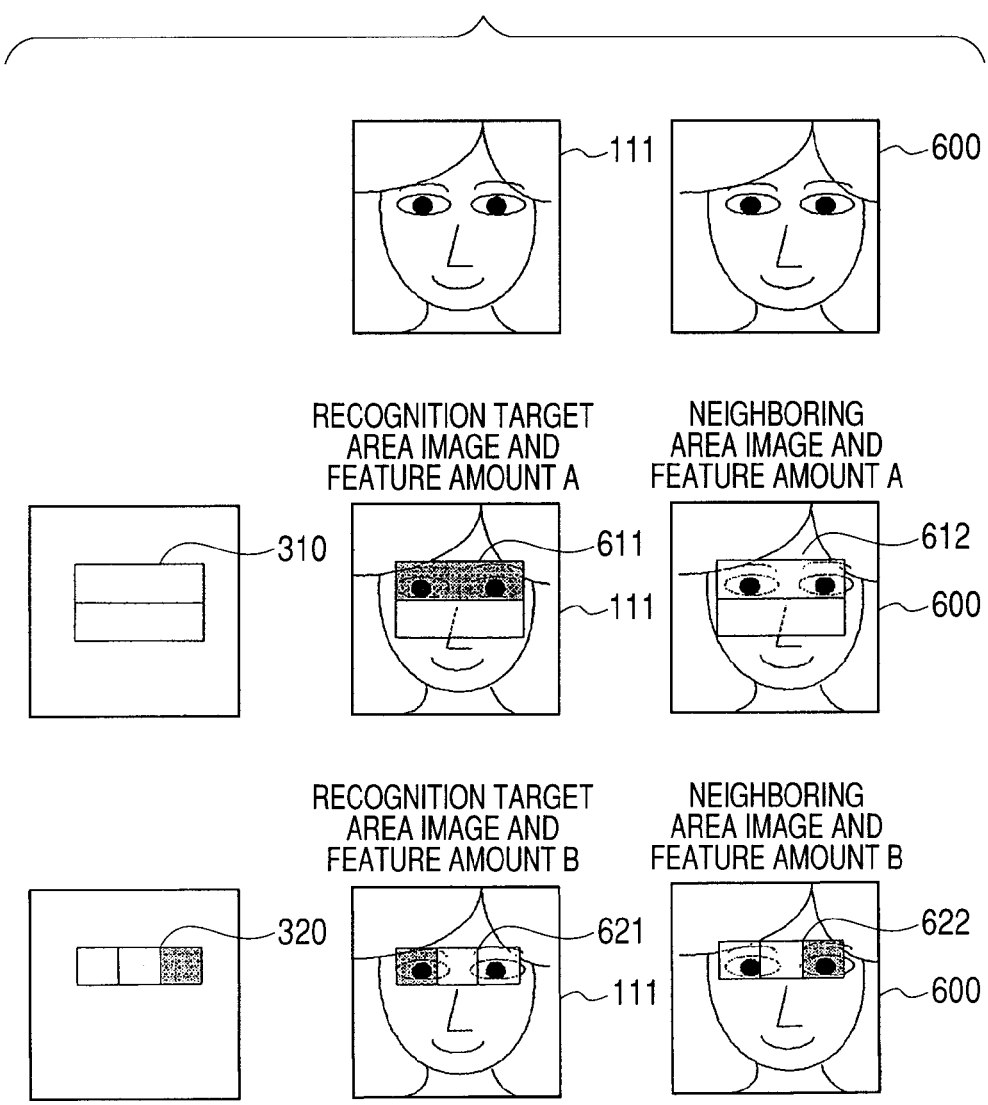
FIG. 6 is a diagram illustrating correlations between feature amounts of a recognition target area image and a neighboring area image.

This principle will be described with reference to FIG. 6. With respect to a current recognition target area image 111, an image pattern shifted by several pixels is referred to as a neighboring area image 600. Results of obtaining the feature amount A (310) and the feature amount B (320) for the recognition target area image 111 are a feature amount A1 (611) and a feature amount B1 (621). Further, results of obtaining the feature amount A (310) and the feature amount B (320) for the neighboring area image 600 are a feature amount A2 (612) and a feature amount B2 (622). Here, since the recognition target area image 111 and the neighboring area image 600 have many overlapping portions, the feature amount A1 (611) and the feature amount A2 (612) are highly correlated and the feature amount B1 (621) and the feature amount B2 (622) are highly correlated.

The recognizers (400) compute these feature amounts and determine recognition results. Therefore, if the feature amounts are highly correlated between the both image patterns, similar recognition processing results will be obtained for the both image patterns.

That is, when the face detection processing is performed according to a processing order predetermined in learning, the processing in the recognizers 1 (401), 2 (402), etc. is performed even if the recognition process is likely to be aborted in the recognizer k (40k). Accordingly, the processing in the recognizers 1 (401), 2 (402) etc. is likely to result in TRUE and probably ends up in a waste. That is, the above-described cascade face detection apparatus does not take into account the correlations between neighboring image patterns. Therefore, the apparatus is not necessarily optimally configured for a case where image patterns are horizontally and vertically scanned one after another from one image and are input.

In the light of the foregoing, a face detection method in the object recognition apparatus will be described. The object recognition apparatus clips out a rectangular area from an image and performs each recognition process by taking an image of the clipped-out rectangular area as an input.

Figure 7:
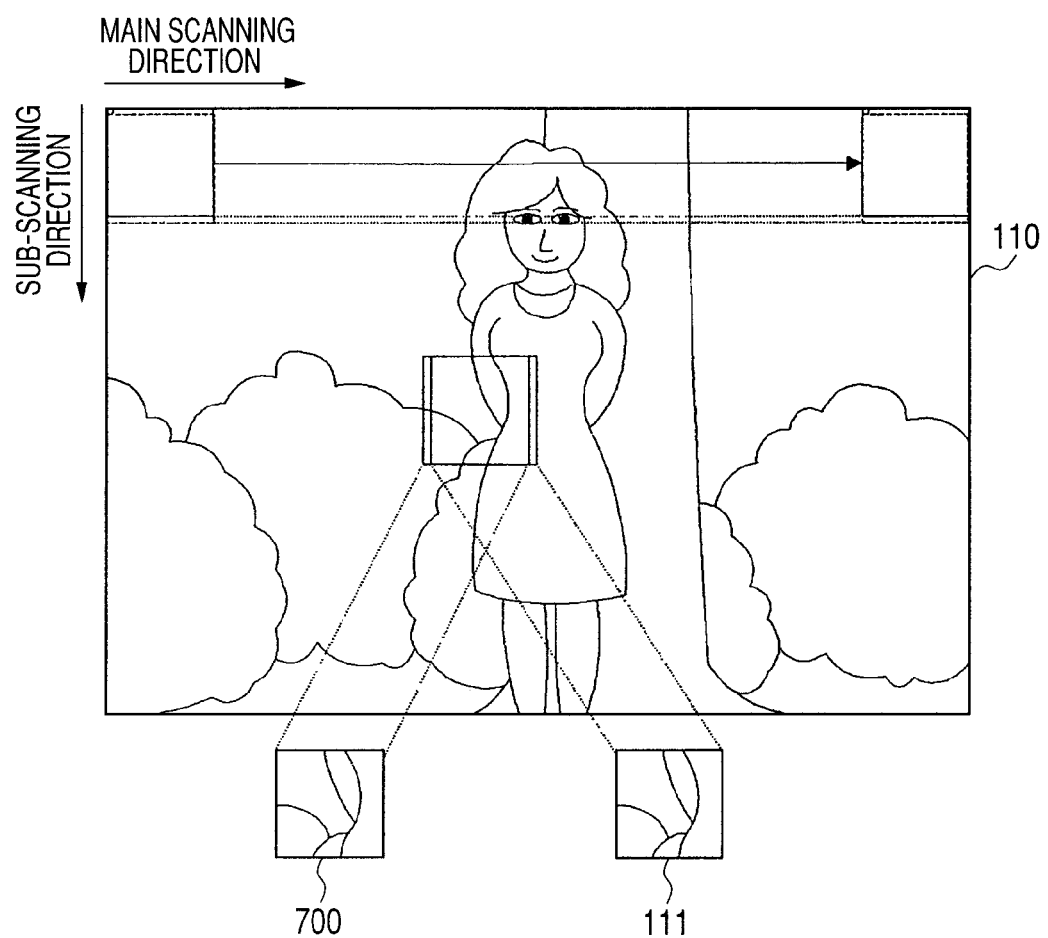
FIG. 7 is a diagram illustrating exemplary raster scan.

As illustrated in FIG. 7, to clip out a rectangular area from an image, the object recognition apparatus employs scanning on a pixel basis in a main scanning direction (horizontal direction) starting with a pixel at the upper-left corner of the image (hereinafter referred to as raster scan). That is, in the raster scan, the object recognition apparatus takes the pixel at the upper-left corner of the input image as a starting point and performs recognition processing for a rectangular area having a pixel at its upper-left corner that matches the starting point. The object recognition apparatus then sequentially performs the recognition processing for a rectangular area shifted by one pixel in the main scanning direction up to a point (end-point) where the right edge of the rectangular area matches the right edge of the input image. The object recognition apparatus then takes a pixel shifted from the starting point of the previous main scan by one pixel in a sub-scanning direction as a starting point, and scans in the main scanning direction. In this manner, while shifting the starting point by one pixel in the sub-scanning direction, the object recognition apparatus performs the processing on a band basis until the bottom edge of the rectangular area match the bottom edge of the input image.

In the raster scan case, the object recognition apparatus can use an area shifted by one pixel (an adjacent area image 700) as the neighboring area image 600. That is, if the adjacent area image 700 has been recognized as FALSE in the recognizer M (40M), the current recognition target area image 111 is also likely to be recognized as FALSE in the recognizer M (40M).

Therefore, if the immediately preceding recognition processing, namely, the recognition processing for the adjacent area image 700 has resulted in FALSE in the recognizer M (40M), the recognition processing for the current recognition target area image 111 is started from the recognizer M (40M). If the recognizer M (40M) yields TRUE, the processing may be restarted from the recognizer 1 (401), or may proceed to a recognizer M+1 (40M+1) and be restarted.

Although the embodiment uses the adjacent area image 700 shifted by one pixel as a reference partial image, this is not limiting. For example, irrespective of the image scanning method, the embodiment may use a partial image of an area shifted from the current recognition target area image 111 by several pixels upward, downward, leftward, or rightward (i.e., an image such as the neighboring area image 600, which is a partial image in the neighborhood of the recognition target area image 111). In this case, the processing result for the neighboring area image 600 may be a processing result for the partial image shifted by several pixels upward, downward, leftward, or rightward, or may be an average of processing results for partial images of surrounding several areas.

Figure 1B:
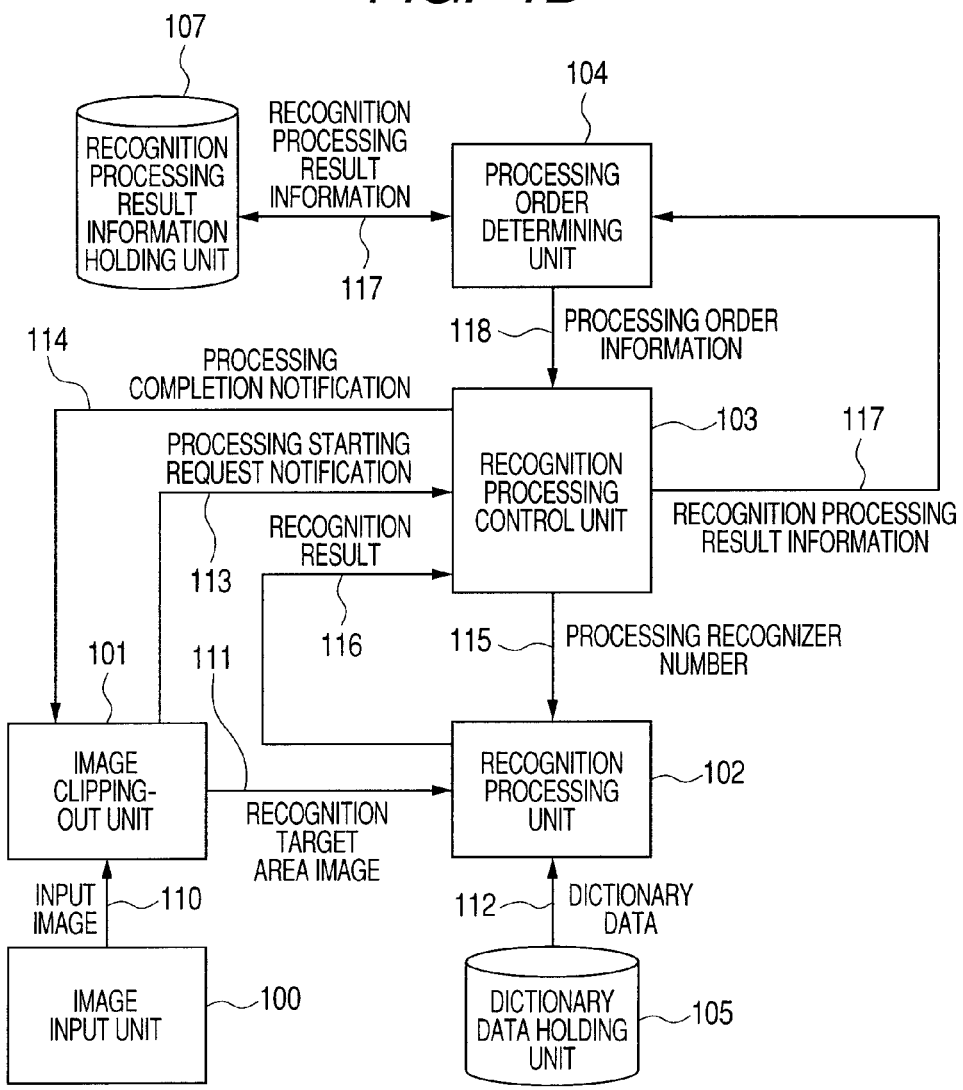

Now, a functional configuration of the object recognition apparatus will be described with reference to FIG. 1B.

The object recognition apparatus includes an image input unit 100, an image clipping-out unit 101, a recognition processing unit 102, a recognition processing control unit 103, a processing order determining unit 104, a dictionary data holding unit 105, and a recognition processing result information holding unit 107.

The image input unit 100 inputs the input image 110, such as a still image taken with a digital camera or a frame image of a moving image.

The image clipping-out unit 101 clips out the recognition target area image 111, which is an image of a rectangular area to be subjected to recognition, from the input image 110 input from the image input unit 100. The embodiment employs the above-described raster scan for the clipping out.

The recognition processing unit 102 determines whether an object is present in the recognition target area image 111 clipped out by the image clipping-out unit 101. In the embodiment, the recognition processing unit 102 is configured as one unit. The recognition processing unit 102 reads dictionary data 112 from the dictionary data holding unit 105 based on input of processing recognizer numbers 115 and performs recognition processing as the respective recognizers (400). In the recognition processing, the recognition processing unit 102 computes feature amounts from the recognition target area image 111 based on the dictionary data 112 and obtains recognition results 116. The dictionary data 112 is obtained in advance by learning-based computation, and different dictionary data items 112 correspond to different recognizers (400).

The recognition processing control unit 103 controls the recognition processing unit 102 to be sequentially executed according to processing order information 118. The processing order information 118 is information indicating in which order the recognizers (400) are executed.

The processing order determining unit 104 determines the processing order information 118 on the request of the recognition processing control unit 103 and outputs the processing order information 118 to the recognition processing control unit 103.

The operation of the object recognition apparatus will be described with reference to FIG. 8.

First, the image input unit 100 inputs the input image 110 (step S801). The input image 110 read at this point is two-dimensional array data with a width of g_width and a height of g_height formed of pixels each represented by an 8-bit luminance, for example.

The image clipping-out unit 101 serving as an example of a clipping-out unit sets positional information (x, y) about the recognition target area image 111 (the position at the upper-left corner of the recognition target area image 111) to the upper-left corner (0, 0) of the input image 110 (step S802).

The image clipping-out unit 101 clips out the recognition target area image 111 (in other words, a partial image) from the input image 110 (step S803). The recognition target area image 111 is two-dimensional array data with a width of s_width and a height of s_height formed of pixels each represented by an 8-bit luminance as with the input image 110, for example. At this point, the image clipping-out unit 101 sends, to the recognition processing control unit 103, a processing starting request notification 113 that includes the positional information about the recognition target area image 111. The recognition processing control unit 103 receives the processing starting request notification 113, and notifies the processing order determining unit 104 of the positional information about the recognition target area image 111 in order to receive the processing order information 118.

The processing order determining unit 104 serving as an example of a determining unit determines whether or not recognition processing result information 117 about the adjacent area image 700 is present in the recognition processing result information holding unit 107 (step S804). If present, the processing order determining unit 104 reads the processing order information 118 determined based on the recognition processing result information 117 about the adjacent area image 700 into a List array (step S806). If the recognition processing result information 117 about the adjacent area image 700 is not present, the processing order determining unit 104 generates the processing order information 118 in a predetermined processing order, for example an order of the recognizers 1 (401), 2, 3, . . . , and n, as a List array (step S805). For the first cycle of the process, the processing order determining unit 104 uses the predetermined order because the recognition processing result information 117 about the adjacent area image 700 is not present. That is, based on the result of the determination (e.g., whether or not the recognition processing result information 117 is present), the processing order determining unit 104 determines the order in which the recognition processing is performed for the recognition target area image 111 and each of the dictionary data items 112.

The recognition processing control unit 103 sequentially operates the recognition processing unit 102 based on the received processing order information 118.

First, the recognition processing control unit 103 initializes a loop variable i (step S807).

The recognition processing control unit 103 inputs an i-th recognizer number in the List array as a processing recognizer number 115 to the recognition processing unit 102. This causes the recognition processing unit 102 to perform processing of the recognizer number List[i] (step S809). That is, the recognition processing unit 102 serving as an example of a recognizing unit reads the dictionary data 112 from the dictionary data holding unit 105 serving as an example of a storage unit based on the input processing recognizer number 115, and performs the recognition processing as a recognizer (400) of this processing recognizer number 115. In the recognition processing, the recognition processing unit 102 computes feature amounts from the recognition target area image 111 based on the dictionary data 112 and obtain the recognition results 116. That is, the recognition processing unit 102 refers to the recognition target area image 111 and each of a plurality of recognition information items for recognizing an object (e.g., a plurality of dictionary data items 112) and determines whether or not the recognition target area image 111 is an image related to the object.

The recognition processing control unit 103 then receives the recognition result 116 from the recognition processing unit 102 and determines TRUE or FALSE (step S810). If the determination results in TRUE (Yes), the recognition processing control unit 103 increments the loop variable i (step S811). The recognition processing control unit 103 determines whether or not the loop variable i is smaller than the total number of processing recognizers n. If the loop variable i is smaller than the total number of processing recognizers n, the recognition processing control unit 103 causes processing of the next recognizer (400) to be performed. If the loop variable i is not smaller than the total number of processing recognizers n, that is, if the loop variable i reaches the total number of processing recognizers n without the occurrence of FALSE in the recognition processing loop, the recognition processing control unit 103 substitutes 0 for an aborted recognizer number NUM (step S814).

If the determination results in FALSE (No), the recognition processing control unit 103 substitutes the recognizer number List[i] that has yielded FALSE for the aborted recognizer number NUM (step S813), and moves the process to step S815. That is, if the recognition target area image 111 is recognized as not an image related to the object, the recognition processing control unit 103 serving as an example of the recognizing unit controls to stop the recognition processing with the remaining dictionary data items 112 not having been referred to among the plurality of dictionary data items 112.

The recognition processing control unit 103 notifies the processing order determining unit 104 of the aborted recognizer number NUM and the positional information (x, y) about the recognition target area image 111 as the recognition processing result information 117. The processing order determining unit 104 stores the received recognition processing result information 117 in the recognition processing result information holding unit 107 (step S815). The stored recognition processing result information 117 will be used in the step of determining whether the recognition processing result information 117 about the adjacent area image 700 is present (step S804).

Thus, the recognition processing for one recognition target area image 111 is finished. At this point, the recognition processing control unit 103 notifies the image clipping-out unit 101 of a processing completion notification 114.

The image clipping-out unit 101 receives the processing completion notification 114 and sets the starting point (x, y) of the recognition target area image 111 to (x+1, y) (step S816). In other words, the image clipping-out unit 101 shifts the recognition target area image 111 by one pixel to the right.

At this point, the recognition processing control unit 103 determines whether or not x is not smaller than "the width g_width of the input image 110—the width s_width of the recognition target area image 111" (step S817). If x is smaller than "the width g_width of the input image 110—the width s_width of the recognition target area image 111," the recognition processing control unit 103 moves the process to the clipping-out processing (step S803) for the next recognition target area image 111. If x is not smaller than "the width g_width of the input image 110—the width s_width of the recognition target area image 111," the recognition processing control unit 103 sets the positional information (x, y) about the recognition target area image 111 to (0, y+1) (step S818). That is, when the recognition target area image 111 reaches the right edge of the input image 110, the recognition processing control unit 103 sets the recognition target area image 111 to the leftmost position in the row one pixel lower than the current position.

Further, the recognition processing control unit 103 determines whether or not y is not smaller than "the height g_height of the input image 110—the height s_height of the recognition target area image 111" (step S819). If y is smaller than "the height g_height of the input image 110—the height s_height of the recognition target area image 111," the recognition processing control unit 103 moves the process to the clipping-out processing (step S803) for the next recognition target area image 111. If y is not smaller than "the height g_height of the input image 110—the height s_height of the recognition target area image 111," the detection processing for the input image 110 is finished at this point. That is, when the recognition target area image 111 reaches the lower-right corner of the input image 110, the recognition processing control unit 103 finishes the detection processing for the input image 110 at that point.

Now, the recognition processing for the next recognition target area image 111 will be described.

First, the image clipping-out unit 101 clips out the next recognition target area image 111 (step S803).

The processing order determining unit 104 determines whether or not the recognition processing result information 117 about the adjacent area image 700 is present (step S804). For example, it is assumed here that the recognition processing result information holding unit 107 holds the recognition processing result information 117 about the previous recognition target area image 111. In this case, the processing order determining unit 104 determines that the recognition processing result information 117 is present. The recognition processing control unit 103 uses the processing order information 118 determined based on the recognition processing result information 117 about the adjacent area image 700. This processing order information 118 is uniquely determined by the processing order determining unit 104 based on the recognition processing result information 117 about the adjacent area image 700. For example, if the aborted recognizer number for the adjacent area image 700 is M, the processing order is determined as the recognizers M (40M), 1, 2, . . . , M−1, M+1, . . . , and N. That is, if a dictionary data item 112 used in recognizing the recognition target area image 111 as not an image related to the object is identified, the processing order determining unit 104 determines the order so that a partial image in the neighborhood of the recognition target area image 111 and the identified dictionary data item 112 are referred to first. Subsequent processing is the same as in the above-described recognition processing flow.

When the recognition target area image 111 is at the leftmost position, the recognition processing result information 117 about the adjacent area image 700 is not present. Therefore, the recognition processing follows the same flow as the recognition processing for the first recognition target area image 111. However, if the recognition processing result information 117 about a neighboring area image 600 one pixel higher than the recognition target area image 111 is present, the processing order determining unit 104 may determine the processing order information 118 based on that recognition processing result information 117.

Figure 9:
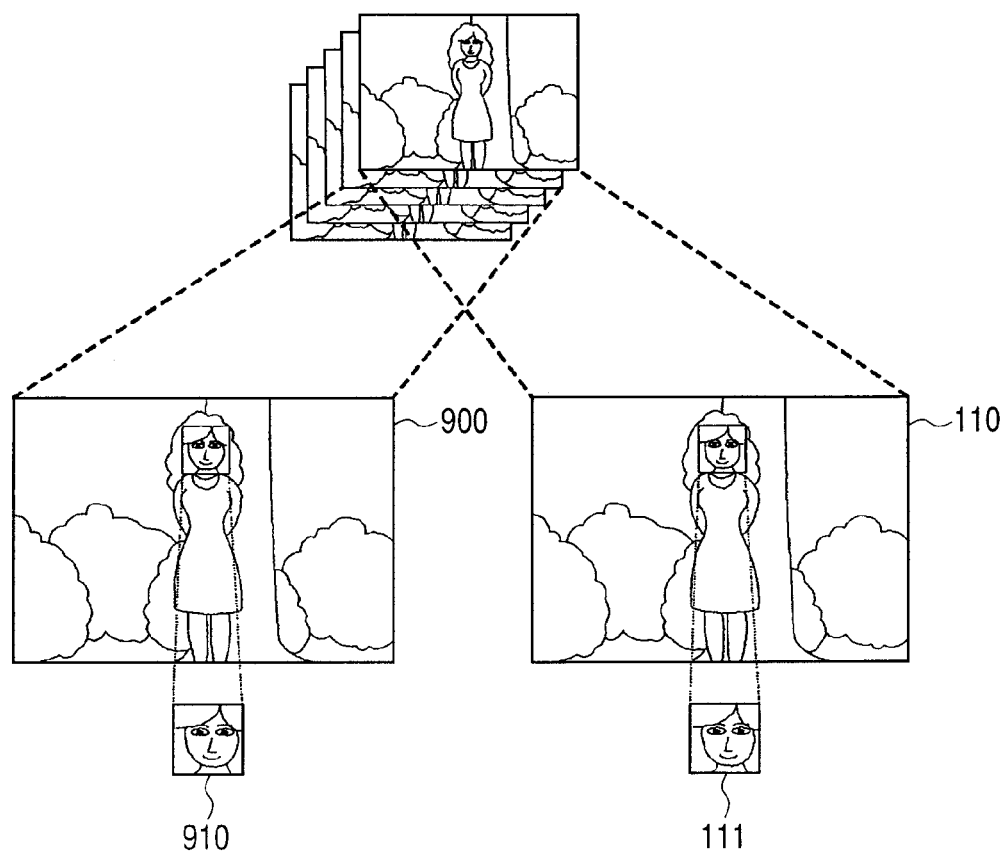
FIG. 9 is a diagram illustrating an exemplary corresponding area image in a moving image.

A second embodiment is for application to a moving image. In the case of a moving image, as illustrated in FIG. 9, an image used as the neighboring area image 600 may be a corresponding area image 910 such as an area image in a temporally immediately preceding frame or in a frame several frames before, among continuous frames. The corresponding area image 910 used here is at the same positional coordinates as the recognition target area image 111 in a frame to be processed.

Figure 8B:
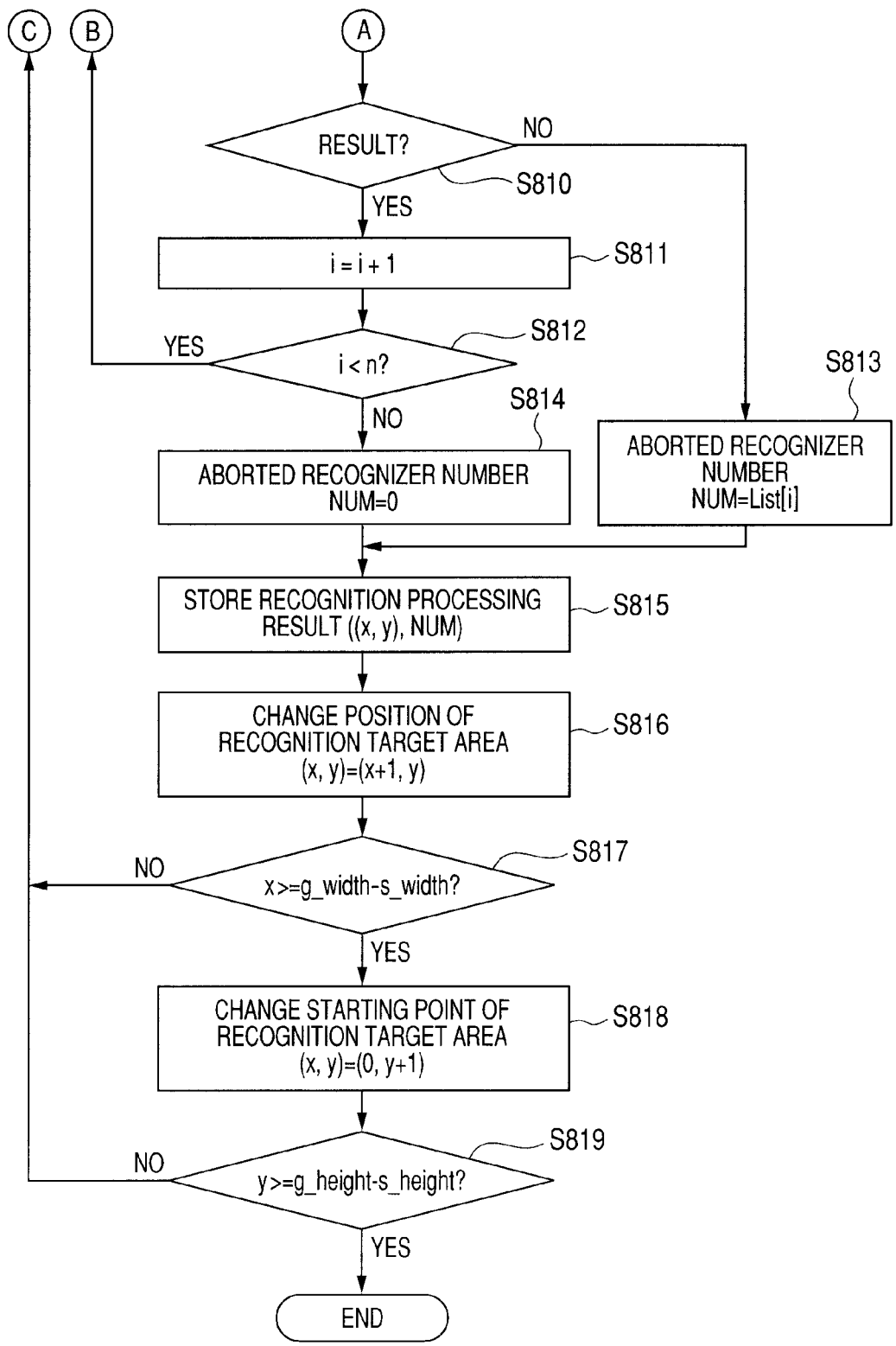
FIG. 8 which is comprised of FIGS. 8A and 8B are diagrams illustrating an exemplary flowchart of processing in the object recognition apparatus.

With reference to FIGS. 8A and 8B, processing in the object recognition apparatus according to the second embodiment will be described with the attention focused on differences from the first embodiment. In the second embodiment, the same numerals as used in the first embodiment will be used for the same components as in the first embodiment.

In step S801, the image input unit 100 inputs a frame image of a moving image as the input image 110. This input image 110 (in other words, one of a series of input images that form the moving image) is basically the same in data format as a still image. Steps S802 and S803 are the same as in the first embodiment and therefore will not be described.

In step S804, instead of the recognition processing result information 117 about the adjacent area image 700, the processing order determining unit 104 determines whether or not the recognition processing result information 117 about the corresponding area image 910 in a preceding frame is present. If present, the processing order determining unit 104 obtains the recognition processing result information 117 about the corresponding area image 910 in the preceding frame from the recognition processing result information holding unit 107 based on the positional information about the current recognition target area image 111, and determines the processing order. If the recognition processing result information 117 about the corresponding area image 910 in the preceding frame is not present, the same steps as illustrated in the first embodiment follow. Step S807 and the following steps are the same as in the first embodiment and therefore will not be described.

The embodiment assumes that the recognition processing result information 117 for a preceding frame is the information about an image at the same positional coordinates as the recognition target area image 111 in the frame to be processed. However, this is not limiting. For example, the recognition processing result information 117 may be the information about an image in the neighborhood of the positional coordinates in question. As another example, it is also possible to predict the position in the preceding frame based on a motion vector between the preceding frame and the current frame to determine the neighboring recognition processing result information 117 to be used. Therefore, the processing order determining unit 104 may determine the order in which the recognition is performed by referring to a partial image corresponding to a partial image in an input image but contained in a different input image, or a partial image in the neighborhood of the corresponding partial image, and each of the dictionary data items 112.

The processing order determining unit 104 according to a third embodiment uses statistical information obtained in advance in learning to determine the processing order of the recognition processing. In the third embodiment, the same numerals as used in the first embodiment will be used for the same components as in the first embodiment.

For example, to detect faces from an image, many images for learning (e.g., images containing no faces) are provided in advance, and the processing order determining unit 104 obtains the statistical information in the following manner. The processing order determining unit 104 associates statistical amounts with respect to which one of the recognizers 1 (401) to N (40N) yields FALSE for a certain rectangular area in an image, with statistical amounts with respect to which recognizer yields FALSE for a rectangular area in the neighborhood of the certain rectangular area.

FIG. 10 illustrates an example of statistical amounts obtained for a case where cascade recognition processing with serially arranged ten recognizers is performed. In the example illustrated in FIG. 10, a value at the intersection of an L-th row and an M-th column indicates the frequency with which a rectangular area in the neighborhood of a rectangular area in the image recognized as FALSE in a recognizer L was recognized as FALSE in a recognizer M. That is, a greater value in the table suggests a higher correlation between FALSE results of recognizers. Therefore, for example, if the adjacent area image 700 that is the neighboring rectangular area was recognized as FALSE in the recognizer 6 (406), the recognition processing is performed in the order of the recognizers 5 (405), 6, 2, . . . , 8 and 10 according to this example. Performing the recognition processing in this order will enable probabilistically efficient cascade recognition processing.

Now, a process flow of using the processing order determination method based on the statistical information will be described with reference to FIG. 8. Since the process flow is similar to the first embodiment except for step S806, description will be made with the attention focused on step S806.

In step S806, based on processing order information held in the processing order determining unit 104, the processing order determining unit 104 presents the processing order information 118 depending on the recognition processing result information 117 about the neighboring area image 600. The processing order information in the processing order determining unit 104 is the statistical information obtained in advance in learning as described above, and is held as a List array for each processing result of the neighboring rectangular area.

The processing order information does not necessarily have to be List arrays in the descending order of correlation illustrated in FIG. 10. For example, if the recognizers constituting the cascade recognition processing involve different amounts of processing operation, the List arrays may be configured so that a recognizer with a smaller amount of processing operation is given higher priority in the processing even if the recognizer has a low correlation between the recognizers.

According to the configurations of the above-described embodiments, the processing is started from a recognizer likely to yield FALSE based on the recognition processing result information 117 about a neighboring image pattern.

Therefore, the recognition processing is aborted earlier, and the processing time is improved.

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-240810, filed Oct. 19, 2009, which is hereby incorporated by reference herein in its entirety.

What is claimed is:

1. An object recognition apparatus comprising:
a clipping-out unit configured to sequentially clip out partial images from an input image;
a recognizing unit configured to recognize that each of the partial images clipped out by the clipping-out unit is or is not an image related to an object by referring to each of a plurality of recognition information items stored in advance in a storage unit for recognizing the object; and
a determining unit configured to determine, based on a recognition result of the recognizing unit for a certain partial image, an order in which the recognizing unit refers to each of the plurality of recognition information items for a partial image in the neighborhood of the certain partial image.

2. The object recognition apparatus according to claim 1, wherein
if a partial image is recognized as not an image related to the object, the recognizing unit stops recognition of the partial image with remaining recognition information items not having been referred to among the plurality of recognition information items.

3. The object recognition apparatus according to claim 1, wherein
if the recognizing unit identifies a recognition information item involved in the recognition of the partial image as not an image related to the object, the determining unit determines the order so that the identified recognition information item is preferentially referred to among the plurality of recognition information items for a partial image in the neighborhood of the partial image recognized as not an image related to the object.

4. The object recognition apparatus according to claim 1, wherein
the determining unit determines the order based on a recognition result of the recognizing unit that the partial image clipped out by the clipping-out unit is not an image related to the object, and on statistical information about each of the plurality of recognition information items with respect to statistics of recognition that learning images provided in advance are not images related to the object.

5. An object recognition apparatus comprising:
a clipping-out unit configured to clip out partial images from each of a series of input images forming a moving image;
a recognizing unit configured to recognize that a partial image in a certain input image clipped out by the clipping-out unit is or is not an image related to an object by referring to each of a plurality of recognition information items stored in advance in a storage unit for recognizing the object; and
a determining unit configured to determine, based on a recognition result of the recognizing unit, an order in which the recognizing unit refers to each of the plurality of recognition information items for a partial image corresponding to the partial image in the certain input image but contained in an input image different from the certain input image, or for a partial image in the neighborhood of the corresponding partial image.

6. The object recognition apparatus according to claim 5, wherein
the determining unit determines the order based on a recognition result of the recognizing unit that the partial image clipped out by the clipping-out unit is not an image related to the object, and on statistical information about each of the plurality of recognition information items with respect to statistics of recognition that learning images provided in advance are not images related to the object.

7. An object recognition method comprising:
sequentially clipping out partial images from an input image;
recognizing that each partial image is or is not an image related to an object by referring to the clipped partial images and each of a plurality of recognition information items stored in advance in a storage unit for recognizing the object; and
determining, based on a recognition result in the recognizing for a certain partial image, an order in which the recognizing refers to each of the plurality of recognition information items for a partial image in the neighborhood of the certain partial image.

8. An object recognition method comprising:
clipping out partial images from each of a series of input images forming a moving image;
recognizing that the partial image in the certain input image is or is not an image related to an object by referring to a partial image in a certain input image clipped out in the clipping and each of a plurality of recognition information items stored in advance in a storage unit for recognizing the object; and
determining, based on a recognition result in the recognizing, an order in which the recognizing refers to each of the plurality of recognition information items for a partial image corresponding to the partial image in the certain input image but contained in an input image different from the certain input image, or for a partial image in the neighborhood of the corresponding partial image.

9. A non-transitory computer-readable storage medium for storing a program that causes a computer to execute an object recognition method, the method comprising:

sequentially clipping out partial images from an input image;

recognizing that each partial image is or is not an image related to an object by referring to the clipped partial images and each of a plurality of recognition information items stored in advance in a storage unit for recognizing the object; and determining, based on a recognition result in the recognizing for a certain partial image, an order in which the recognizing refers to each of the plurality of recognition information items for a partial image in the neighborhood of the certain partial image.

10. A non-transitory computer-readable storage medium for storing a program that causes a computer to execute an object recognition method, the method comprising:

clipping out partial images from each of a series of input images forming a moving image;

recognizing that the partial image in the certain input image is or is not an image related to an object by referring to a partial image in a certain input image clipped out in the clipping and each of a plurality of recognition information items stored in advance in a storage unit for recognizing the object; and determining, based on a recognition result in the recognizing, an order in which the recognizing refers to each of the plurality of recognition information items for a partial image corresponding to the partial image in the certain input image but contained in an input image different from the certain input image, or for a partial image in the neighborhood of the corresponding partial image.

* * * * *